United States Patent
Apostolescu et al.

(10) Patent No.: US 10,708,296 B2
(45) Date of Patent: Jul. 7, 2020

(54) MALWARE DETECTION BASED ON TRAINING USING AUTOMATIC FEATURE PRUNING WITH ANOMALY DETECTION OF EXECUTION GRAPHS

(71) Applicant: THREATTRACK SECURITY, INC., Clearwater, FL (US)

(72) Inventors: Paul Apostolescu, Ashburn, VA (US);
Melvin Antony, Herndon, VA (US);
Aboubacar Toure, Ashburn, VA (US);
Jeff Markey, Sterling, VA (US);
Prathap Adusumilli, Clearwater, FL (US)

(73) Assignee: Threattrack Security, Inc., Clearwater, FL (US)

( * ) Notice: Subject to any disclaimer, the term of this patent is extended or adjusted under 35 U.S.C. 154(b) by 192 days.

(21) Appl. No.: 14/658,808

(22) Filed: Mar. 16, 2015

(65) Prior Publication Data
US 2016/0277423 A1    Sep. 22, 2016

(51) Int. Cl.
*G06F 21/00* (2013.01)
*H04L 29/06* (2006.01)
(Continued)

(52) U.S. Cl.
CPC .......... *H04L 63/145* (2013.01); *G06F 21/566* (2013.01); *G06N 5/003* (2013.01);
(Continued)

(58) Field of Classification Search
CPC .............. H04L 63/145; H04L 63/1416; H04L 63/1425; G06F 17/30958; G06N 99/005
See application file for complete search history.

(56) References Cited

U.S. PATENT DOCUMENTS 8,312,545 B2    11/2012  Tuvell et al.
8,479,296 B2     7/2013  Mashevsky et al.
(Continued)

FOREIGN PATENT DOCUMENTS

EP    2 182 458           5/2010
WO    WO-2014/149080      9/2014
WO    WO-2014152469 A1 *  9/2014 .......... G06F 21/566

OTHER PUBLICATIONS

Zahra Bazrafshan ; Hashem Hashemi ; Seyed Mehdi Hazrati Fard; Ali Hamzeh; "A survey on heuristic malware detection techniques"; The 5th Conference on Information and Knowledge Technology; Year: Apr. 2013; pp. 113-120 (Year: 2013).*

(Continued)

*Primary Examiner* — Kendall Dolly
*Assistant Examiner* — Courtney D Fields
(74) *Attorney, Agent, or Firm* — Womble Bond Dickinson (US) LLP

(57) ABSTRACT

A threat detection system for detecting malware can automatically decide, without manual expert-level interaction, the best set of features on which to train a classifier, which can result in the automatic creation of a signature-less malware detection engine. The system can use a combination of execution graphs, anomaly detection and automatic feature pruning. Execution graphs can provide a much richer structure of runtime execution behavior than conventional flat execution trace files, allowing the capture of interdependencies while preserving attribution (e.g., D happened because of A followed by B followed by C). Performing anomaly detection on this runtime execution behavior can provide higher order knowledge as to what behaviors are anomalous or not among the sample files. During training the system can automatically prune the features on which a classifier is trained based on this higher order knowledge (Continued)

without any manual intervention until a desired level of accuracy is achieved.

17 Claims, 7 Drawing Sheets

(51) Int. Cl.
  *G06F 21/56* (2013.01)
  *G06N 20/00* (2019.01)
  *G06N 20/20* (2019.01)
  *G06N 5/00* (2006.01)
  *G06N 7/00* (2006.01)
  *G06F 11/00* (2006.01)
  *G06F 21/44* (2013.01)
  *G06F 21/52* (2013.01)

(52) U.S. Cl.
  CPC ............ *G06N 7/005* (2013.01); *G06N 20/00* (2019.01); *G06N 20/20* (2019.01); *H04L 63/1425* (2013.01)

(56) References Cited

U.S. PATENT DOCUMENTS

| | | | |
|---|---|---|---|
| 8,490,195 | B1 | 7/2013 | Chen et al. |
| 8,516,584 | B2 | 8/2013 | Moskovitch et al. |
| 8,566,928 | B2* | 10/2013 | Dagon .............. H04L 29/12066 726/22 |
| 8,631,492 | B2 | 1/2014 | Yablokov |
| 8,763,127 | B2 | 6/2014 | Yao et al. |
| 8,776,231 | B2 | 7/2014 | Moskovitch et al. |
| 8,793,790 | B2 | 7/2014 | Khurana et al. |
| 2005/0223238 | A1 | 10/2005 | Schmid et al. |
| 2009/0013405 | A1 | 1/2009 | Schipka |
| 2009/0172815 | A1* | 7/2009 | Gu ........................ G06F 21/552 726/23 |
| 2010/0180344 | A1 | 7/2010 | Malyshev et al. |
| 2011/0041179 | A1 | 2/2011 | Ståhlberg |
| 2012/0323829 | A1* | 12/2012 | Stokes .................. G06F 21/563 706/12 |
| 2013/0198119 | A1 | 8/2013 | Eberhardt, III et al. |
| 2013/0247202 | A1 | 9/2013 | Yablokov |
| 2014/0013434 | A1 | 1/2014 | Ranum et al. |
| 2014/0090061 | A1* | 3/2014 | Avasarala ............... G06F 21/56 726/24 |
| 2014/0150101 | A1 | 5/2014 | Chiu et al. |
| 2014/0223566 | A1 | 8/2014 | Zaitsev |
| 2015/0033341 | A1* | 1/2015 | Schmidtler ............ H04L 63/14 726/23 |

OTHER PUBLICATIONS

Arnold, William et al., (Sep. 2000) "Automatically Generated WIN32 Heuristic Virus Detection," Virus Bulletin Conference, pp. 51-60.

Cai, D. Michael et al., (2005) "Detecting a Malicious Executable without Prior Knowledge of Its Patterns," Space Data Systems Group and Space and Remote Sensing Group Los Alamos National Laboratory, Los Alamos, NM 87545; 12 pages.

Kim, Keehyung et al., (ACM 2010) "Malware Detection based on Dependency Graph using Hybrid Genetic Algorithm," pp. 1211-1218.

Shabtai, Asaf et al., "Andromaly: a behavioral malware detection framework for android devices," Springer Science+Business Media, LLC, published online: Jan. 6, 2011; 30 pages.

McRee, Russ, "Visual Malware Analysis with ProcDOT," ISSA Journal Jun. 2013, pp. 49-52.

"Welcome to ProcDOT (homepage) a new way of visual malware analysis," ProcDot.com, printed Feb. 22, 2015; 1 page.

"Statistical classification," from Wikipedia, located at https://en.wikipedia.org/wiki/Statistical_classification, printed Feb. 24, 2015; 7 pages.

International Search Report and Written Opinion dated Jun. 16, 2016, directed to International Application No. PCT/US2016/22703; 11 pages.

* cited by examiner

MALWARE DETECTION BASED ON TRAINING USING AUTOMATIC FEATURE PRUNING WITH ANOMALY DETECTION OF EXECUTION GRAPHS

FIELD OF THE DISCLOSURE

This relates to threat detection over computer networks, including detecting malware in received files.

BACKGROUND

Malware is refers to malicious software, such as software intended to damage or disable computers and computer systems, disrupt computer operation, gather sensitive information or gain access to private computer systems without permission. Examples of malware include viruses, worms and Trojans.

Traditional signature-based security solutions compare the contents of a file to its database of known malware signatures to detect malware. However, with millions of new variants of malware bypassing traditional signature-based security solutions, today's threat landscape has many organizations scrambling to shore up their cyber defenses. High-profile data breaches are grabbing headlines, eroding customer confidence and costing organizations millions.

More recent solutions for combatting malware employ sandbox detection and data mining techniques. Sandbox detection refers to a behavioral technique by which a file is first run and monitored for malicious behavior in a secure environment before being allowed to proceed to its destination. Data mining techniques use machine learning to classify a file as malicious or benign given a set of file behaviors extracted from the file itself. Machine learning involves a training and runtime aspect. In the training aspect, a large number of sample files (e.g., "big data") labeled as malicious or benign are provided to an algorithm referred to as a classifier to train the classifier (i.e., to allow the classifier to "learn") on which behaviors are more likely to indicate a malicious or a benign file. During the runtime aspect the classifier analyzes behaviors of a new file in real time and classifies the file as malicious or benign based on its understanding of those behaviors in training.

These solutions, however, are inefficient because the burden of making sense of the data is on the user. With sandbox detection, a user is either required to manually review and inspect the output of an execution trace (i.e., the log of the behavior of the file while being run in the sandbox) or required to program rules to look for specific behaviors that the user must know about beforehand. With machine learning, a classifier such as Random Forests can be trained to classify behavior as malicious or benign given a large number of behavior training sets, but a user must manually tweak and weed out irrelevant rules using false positives and false negatives to improve the accuracy of the results.

SUMMARY

A threat detection system for detecting malware is disclosed. Unlike current machine learning solutions that use big data for validating classifiers during training but require manual expert-level interaction to improve accuracy, the threat detection system disclosed herein can use big data to automatically decide, without manual expert-level interaction, the best set of features on which to train a classifier, which can result in the automatic creation of a signature-less malware detection engine.

The system can accomplish this by using a combination of execution graphs, anomaly detection and automatic feature pruning. Execution graphs can provide a much richer structure of runtime execution behavior than conventional flat execution trace files, allowing the capture of interdependencies while preserving attribution (e.g., D happened because of A followed by B followed by C). Performing anomaly detection on this runtime execution behavior can provide higher order knowledge as to what behaviors are anomalous or not among the sample files. During training the system can automatically prune the features on which a classifier is trained based on this higher order knowledge without any manual intervention until a desired level of accuracy is achieved.

DETAILED DESCRIPTION

The present disclosure is directed to a threat detection system for detecting malware. Although the embodiments disclosed herein describe threat detection in the context of malware in files and over e-mail, the threat detection system is not so limited and can be used to provide threat detection for any type of threat to a computer network, such as intrusion detection, in accordance with the teachings of the present disclosure.

Unlike current machine learning solutions that use big data for validating classifiers during training but require manual expert-level interaction to improve accuracy, the threat detection system disclosed herein can use big data to automatically decide, without manual expert-level interaction, on the best set of features on which to train a classifier, which can result in the automatic creation of a signature-less malware detection engine. The system can accomplish this by using a combination of execution graphs, anomaly detection and automatic feature pruning.

An execution graph refers to a graph of a file's runtime execution behavior. The execution graph can be based on any model that reflects the dynamic execution environment in which a file is run. In one embodiment a dynamic execution environment for malware detection can be formalized by specifying a well-defined set of mathematical objects (states) from defined domains, the operations that can be executed on those (actions on state) and how the operations can be composed to create higher order functionality (labeling). In other words, a mathematical model can be created of a running operating system instance, and that model and its associated transitions can be used to capture and reason about the execution of a malicious file.

Figure 4:
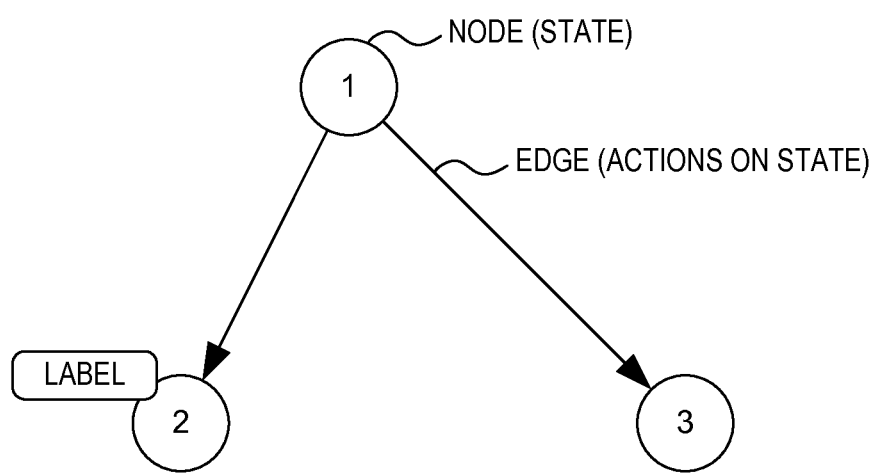
FIG. 4 illustrates an example structure of an execution graph.

FIG. 4 illustrates an example structure of an execution graph. In this example graph structure the nodes can represent states and can be labeled, and the edges can represent actions on state. The states can be from any defined domain suitable for the execution environment in which the files are to be run, such as the following defined domains:

FS—file system
REG—registry
NET—network
SYS—system
GUI—user interface
SEC—security
AN—analysis The states can comprise the actors such as process IDs, files, external connections and any other suitable actor that acts on a state. The actions on state can comprise action suitable for the execution environment in which the files are to be run, such as READ, WRITE, CREATE, UPDATE, DELETE, OPEN, CLOSE, LOAD, UNLOAD, CONNECT, DISCONNECT, COPY, MOVE, REPLACE, FIND, WAIT, START and STOP action types and IN, OUT, and INOUT action kinds (e.g., specifying the direction of the action).

Figure 5:
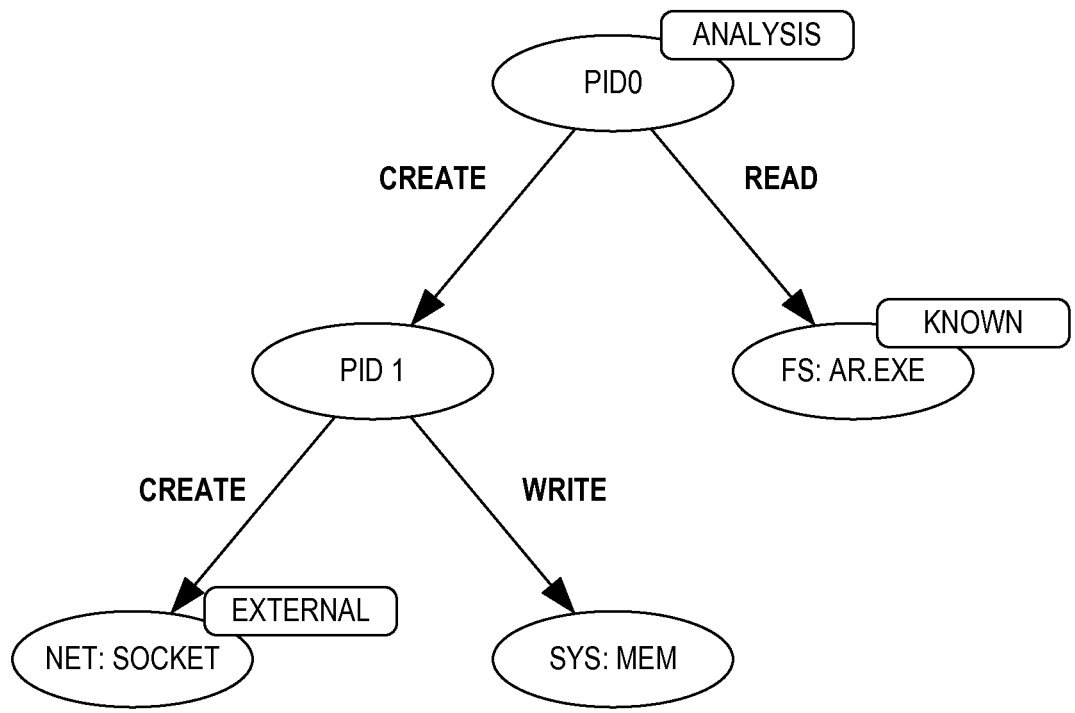
FIG. 5 illustrates an example of an execution graph.

FIG. 5 illustrates an example of an execution graph for a particular type of behavioral analysis (ANALYSIS) for which the vertex is labeled. This particular analysis shows the causality of process ID zero (PID 0), which reads (READ) from a file (AR.EXE") labeled as known (KNOWN) by the system and creates (CREATE) process ID one (PID 1). Process ID one then writes (WRITE) to system memory (SYS: MEM) and creates (CREATE) an external (EXTERNAL) connection (NET: SOCKET).

The execution graph of FIG. 5 is just one example of the many types of execution graphs that can be generated by the threat detection system. In one embodiment, an original execution graph can be generated from an execution trace file that was output in response to monitoring of the running file (e.g., in a sandbox). In other embodiments the original execution graph can be generated directly at runtime (i.e., in real time while monitoring the running file) bypassing the execution trace file. The present disclosure is not limited to the date source which is used to generate the execution graph, and any suitable data source can be used.

The system can map the runtime execution data to corresponding nodes and edges of the execution graph so that the execution graph can contain all of the information the system is configured to focus on. This original execution graph can be used to further derive sub-graphs (i.e., other execution graphs) of various actions and effects by action type, data type, etc. Such sub-graphs can be limited to particular types of analysis, such as persistent changes, causality and process for example, but are not limited in number. In some embodiments the sub-graphs can number in the hundreds or thousands depending upon the filtering criteria of the system and what the system is programmed to focus on. A commonality of all of the possible sub-graphs is mapping state and execution (i.e., the state transfer between objects), with the difference among the sub-graphs being the particular actions and states (objects) represented. Any suitable graph library can be used to generate the graph, such as the JGraphT tool or BoostGraph. Any suitable data store, such as a graph database, can be used to hold or store execution graphs.

Thus, given runtime execution data (e.g., from an execution trace) the system can create a taxonomized formal graph model (execution graph) enriched with process and activity metadata to enable creation of multiple security relevant behavioral models (execution graphs) for detection of malware. Behavioral models can be generated using graph algorithms that leverage the relationships and the contextual process and activity metadata. These execution graphs can then be used for visualization and behavioral anomaly detection, for example.

Processing runtime execution data and generating an execution graph can therefore comprise using a unified, well-defined taxonomy for domains and actions, result in a very rich structure which discovers and captures accurately interdependencies while preserving attribution, and be suitable for application of well-defined mathematical graph operations such as subgraphs, graph coloring, node labeling, etc. The system is not only making sense of the runtime execution data but also offering a very powerful base for data mining and enrichment. Causality is front and center, since the execution graph can for example determine exactly D happened because of A followed by B followed by C, etc. Further, accuracy advancements in the sandbox (i.e., providing better and/or more complete runtime execution data) can result in direct improvements to the model.

The system can extract and learn from the execution graphs behaviors such as metrics, labeled actions and patterns. On metrics, the system can calculate volumetric (e.g., "how much memory was allocated", "how much it waits") as well as frequency (e.g., "how much memory", "how many file deletes") metrics. On labeled actions, the system can match data changed against values of interest (e.g., "IE proxy settings", "System folder"). On patterns, the system can identify preconfigured patterns (e.g., "deleted itself", "execution depth is 5", "copies and retrieves info from network", "a followed by b followed by z").

Performing anomaly detection on runtime execution behavior extracted from the execution graph provides higher order knowledge as to what behaviors are anomalous or not among the sample files. During training the system can automatically prune the features on which a classifier is trained based on this higher order knowledge without any manual intervention until a desired level of accuracy is achieved.

For example, in performing anomaly detection the system can plot ranges of values for metrics and calculate anomalous values (e.g., using algorithms such as "IQR", "3-Sigma") and detect anomalous patterns and activity detection ("IE Proxy changes in 80% of bad, 20% of good"). Based on this information the system can create one or more classifiers (e.g., one for each type of file, such as executable files/*.exe files, word processing documents, PDF files/*.pdf files, etc.) by automatically selecting the best features by iterative training and feature pruning.

Any suitable file type can be used by the system. For example, the system can be extensible such that as long as the file is labeled (e.g., benign/malicious) and is capable of running and generating an execution trace/graph, the system can perform automatic feature extraction/pruning and then automatically generate the most efficient classifier for malware detection of that particular file type based on the features most relevant to that file type. Thus, the system can take into account features relevant to different file types and auto generate the most efficient classifier for that type.

With this process all features can be automatically generated from the execution graph without any manual intervention. Improving the model upon which the execution graph is based can therefore improve the features. The system can derive higher order knowledge by discovering anomalous values for metrics, which is big data at its best and cannot be done manually by the user. The system can also automatically prune features during training without any manual intervention, which can result in a complete, end-to-end system to build classifiers without expert help.

In other words, the system can be based on its own metrics. The system can iteratively select features, train a classifier and continue selecting/dropping/adding/removing features until it finds the classifier which has the best accuracy in terms of the malware detection. The system can select the features for training for the user using mathematical models and statistical modeling. The system can collect behaviors from the execution graph and, due to the anomaly detection, understand what is normal what is not and use all the data to down select only the features that provide the best chance of detecting if a new sample is good or bad. The system can then perform machine learning only on those features.

Figure 1:
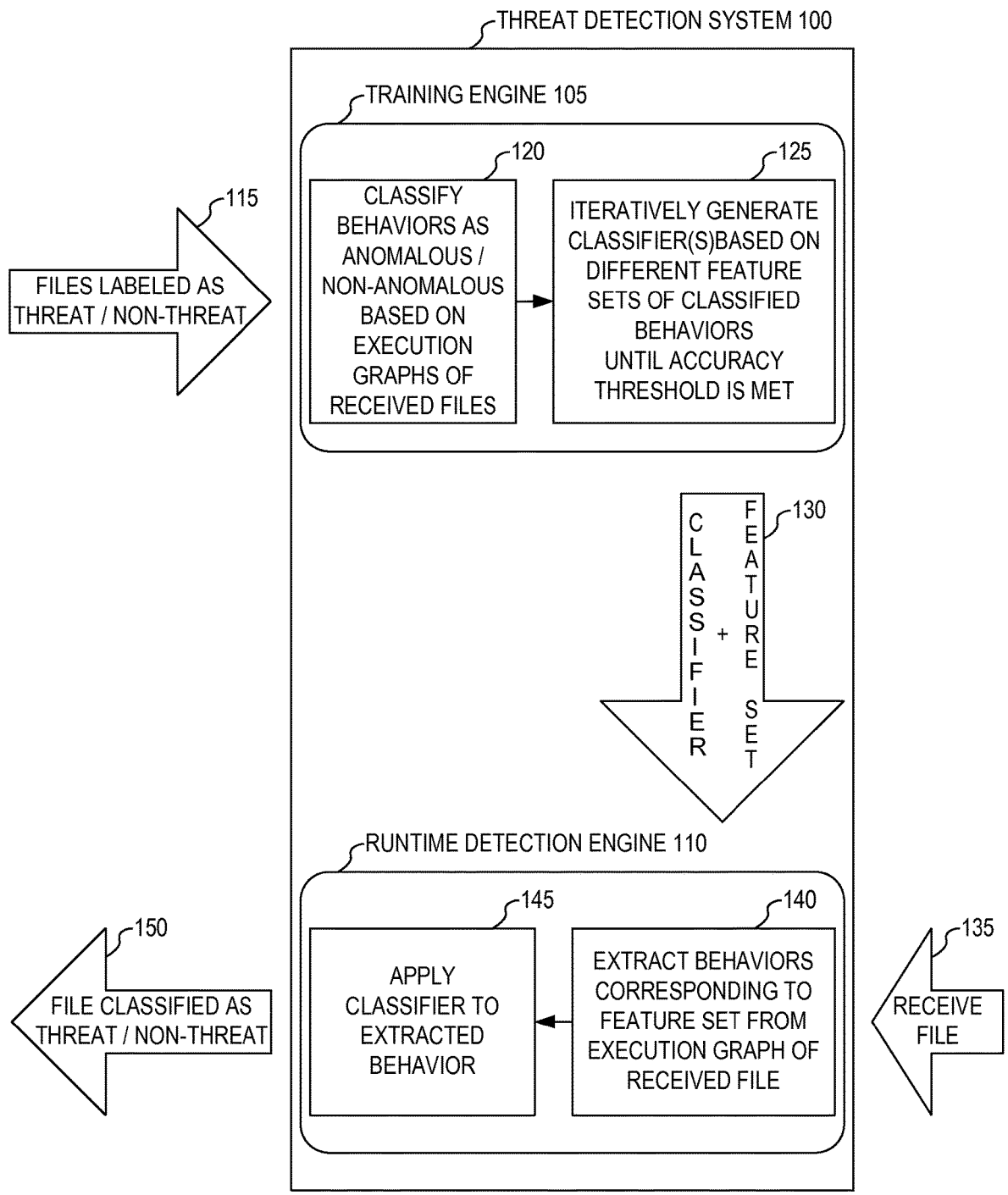
FIG. 1 illustrates an example of a threat detection system that classifies threats in received files.

FIG. 1 illustrates an example of a threat detection system that classifies threats in received files. System 100 can comprise one or more processors deploying training engine 105 and runtime detection 110, which can comprise the programming (e.g., one or more software programs and/or modules) embodying the functionality of system 100 described in the various embodiments of the present disclosure. In one embodiment, training engine 105 and runtime detection 110 can be implemented on different computing devices at different locations (e.g., sites, such as client site, cloud, etc.). In another embodiment, training engine 105 and runtime detection 110 can be implemented on the same computing device at the same location. In yet another embodiment, training engine 105 and runtime detection 110 can be implemented on different computing devices at the same location.

For the training aspect of malware detection, training engine 105 can receive (115) sample data in the form of multiple files labeled as a threat (i.e., malware/bad) or non-threat (i.e., non-malware/good). The receiving of the sample files can include any manner of inputting the files into training engine 105, including retrieving the files, in part or whole, from a local or remote data store (e.g., a database) or loading them from other electronic media. The number of files can be any suitable size, though a larger number (e.g., hundreds or thousands) can improve the accuracy of training engine 105.

Once received, training engine 105 can classify (120) behaviors of the multiple files as anomalous or non-anomalous based on execution graphs of the files, and iteratively generate (125) one or more classifiers using different feature sets of the classified behaviors per iteration until an accuracy threshold is met or exceeded. Once the accuracy threshold is met or exceeded, training engine 105 can output (130) the final one or more classifiers and the feature set of classified behaviors for classification of files as a threat or non-threat.

For the runtime detection aspect of malware detection, runtime detection engine 110 can load (130) the outputted one or more classifiers and the feature set of classified behaviors, receive (135) a file (e.g., in real time), extract (140), from an execution graph of the received file, behaviors corresponding to the loaded feature set, apply (145) the loaded one or more classifiers to the extracted behaviors, and output (150), the received file with a label of threat or non-threat based on the classification (i.e., the application of the loaded one or more classifiers to the extracted behaviors).

Although the terms "feature" and "behavior" are often used interchangeably, for the purposes of this disclosure the term "feature" is generally intended to refer to a type of behavior, whereas a "behavior" is generally intended to refer to an instance of a feature. For example, a size of a file can be considered a feature, whereas the actual size (e.g., 100 MB) can be considered a behavior of the feature.

Figure 2:
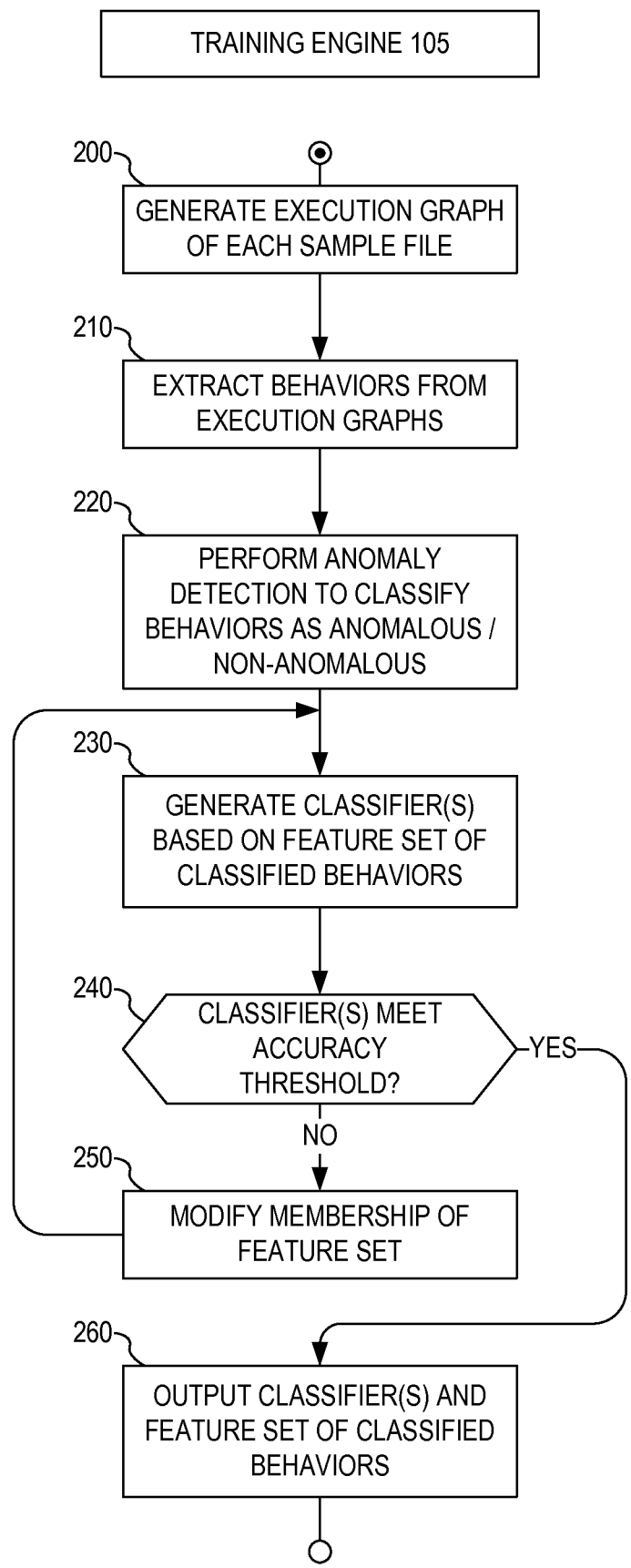
FIG. 2 illustrates an example of a training process used by the threat detection system of FIG. 1.

FIG. 2 illustrates an example of a training process used by the threat detection system of FIG. 1. Steps 200, 210 and 220 generally correspond to step 120, steps 230, 240 and 250 generally correspond to step 125, and step 260 generally corresponds to step 130.

In particular, training engine 105 can generate (200) an execution graph of each of the received files and extract (210) the behaviors from the execution graphs. This can be implemented in one embodiment by, for each of the received files (e.g., thousands):
  i) running the sample file in a sandbox and collecting its execution trace using known or custom tools,
  ii) generating an execution graph (such as those described above, for example) from the execution trace,
  iii) enriching the execution graph (e.g., via labeling important nodes/edges),
  iv) extracting behaviors from the execution trace and
  v) collecting all of the extracted behaviors in a list.

After these steps have been completed for all sample files, all of the behaviors for all of the sample files (both good and bad) can be collected into a data set with each entry from the dataset being a pair of (label, behaviors) where label is "good" (i.e., non-threat) or "bad" (i.e., threat).

Once collected into the data set, training engine 105 can perform (220) anomaly detection on the extracted behaviors in the data set to classify the behaviors as anomalous or non-anomalous. This can be implemented by performing anomaly detection on all behaviors, aggregating all anomaly detection into a single "feature set" and collecting all anomalies into a large matrix.

In performing anomaly detection on all behaviors, for each possible observed behavior from all the samples:
  i) if the behavior is a number, anomaly detection can be performed on the value series for all observed values (examples of anomaly detection functions are IQR or 3-sigma),
  ii) if the behavior is pattern, a probability distribution can be performed of "seeing this in good" vs "seeing this in bad" (e.g., "explorer gets deleted"—0% in good, 100% in bad; "temp folder used"—50% in good, 50% in bad), and
  iii) other suitable anomaly detection can be applied on that behavior across the whole data set.

For example, the following shows results of anomaly detection on volumetric metrics:
  "/SYSTEM/MEMORY/OPEN/SUCCESS"
  "/SYSTEM/MEMORY/OPEN/SUCCESS/WMIPRVSE.EXE/SIZE"
using IQR:
  Q75:
  "/SYSTEM/MEMORY/OPEN/SUCCESS": 114794608.25,
  "/SYSTEM/MEMORY/OPEN/SUCCESS/WMIPRVSE.EXE/SIZE": 40202240.0,
  IQR:
  "/SYSTEM/MEMORY/OPEN/SUCCESS": 94490686.25,
  "/SYSTEM/MEMORY/OPEN/SUCCESS/WMIPRVSE.EXE/SIZE": 16080896.0, And the following shows a calculated probability of each metric being anomalous on good and bad:
  "/SYSTEM/MEMORY/OPEN/SUCCESS",
  467.4449429623596,
  0.007756895929679556,
  0.0016594245047387688
  "/SYSTEM/MEMORY/OPEN/SUCCESS/WMIPRVSE.EXE/SIZE", 383.44320902620615,
0.00013119485716159927,
3.4214938242036474e-05

In aggregating all anomaly detection into a single "feature set":
i) if the behavior is exhibited by a sample (e.g., the value is anomalous) a match exists ("1")
ii) if the behavior is not exhibited by a sample (e.g., the value is not anomalous) a match does not exists ("0")

In collecting all anomalies into a large matrix, the columns can represent file label and features (e.g., label, explorer delete, temp folder user) and the rows can represent the corresponding data for each sample file (e.g., "bad", "1", "0").

Training engine 105 can generate (230) one or more classifiers based on a particular feature set of the classified behaviors. If the one or more classifiers do not meet or exceed (240) an accuracy threshold, training engine 105 can iteratively modify (250) the membership of the feature set of the classified behaviors and generate (230) the one or more classifiers again based on the modified feature set until the one or more classifiers meet or exceed (240) the accuracy threshold. This automatic feature pruning can be implemented in an iterative manner as follows:
i) Process training data to increase accuracy: apply various methods to improve data quality
  a) Remove duplicated rows with different labels (e.g., same behaviors for both good and bad)
  b) Remove highly correlated (e.g., the dependence or the degree to which two features are related) features (columns) using suitable correlation algorithms such as common measures like Pearson's correlation coefficient (e.g., it's the same if you have feature a or b—you don't need them both)
  c) Apply other suitable methods to remove features that are not relevant.

For example, the system can leverage variable importance feedback from the model generation algorithm to prune out low impact features. Some predictive modeling algorithms such as Random Forest, gradient boosted machines, etc., can perform some feature importance internally when constructing their model during the training process. These algorithms can also report on the variable importance that was determined during the training process, which can then be used by the system to prune out low impact features.
ii) Train
  a) Using the training data create multiple classifiers using machine learning
    1) Examples of classifiers are Random Forest, Bayesian, etc.
  b) Verify accuracy: check accuracy on a testing set against a threshold (e.g., 99.90%)
    2) If accuracy is good (greater) exit—convergence is achieved
iii) Repeat i) and ii) until convergence—i.e., the system provides classifiers with the desired accuracy rate When the one or more classifiers meet or exceed (240) the accuracy threshold, training engine 105 can output (260) the final one or more classifiers and the feature set of classified behaviors to runtime detection engine 110 for classification of files as a threat or non-threat. For example, if training engine 105 is located at the developer site and runtime detection engine 110 is located at a client site (e.g., as part of a runtime product separate from the training aspect), this step can involve electronically shipping the one or more classifiers and feature set to the client site. The one or more classifiers can be kept along with the feature set that went into it (i.e., the remaining features that were not pruned during training). The classifier can include or be distinct from the feature set.

Figure 3:
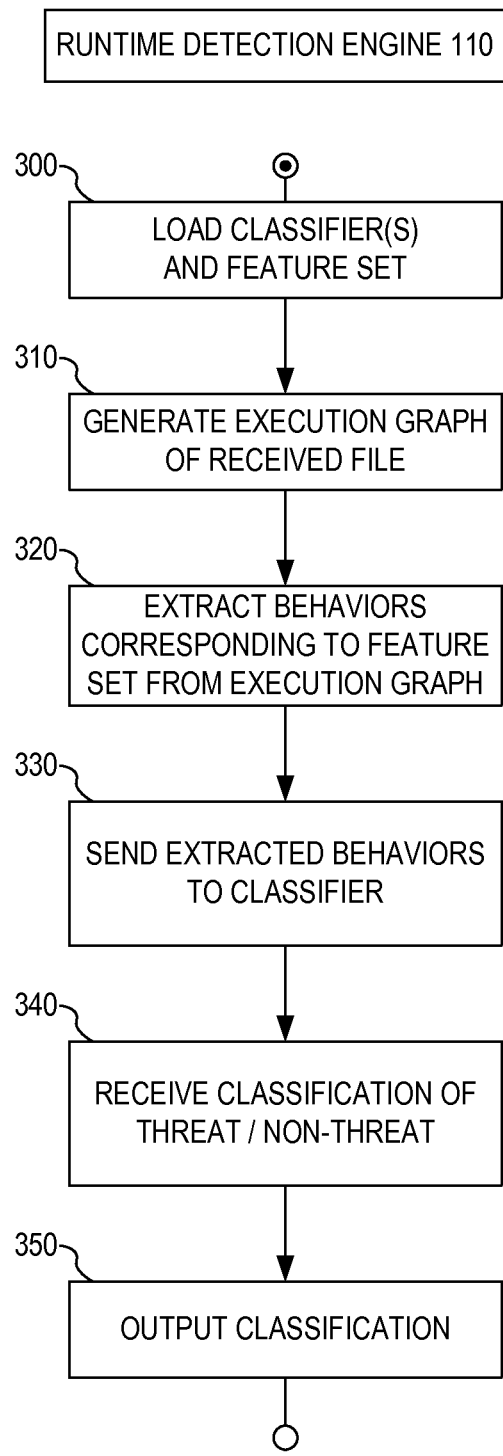
FIG. 3 illustrates an example of a runtime detection process used by the threat detection system of FIG. 1.

FIG. 3 illustrates an example of a runtime detection process used by the threat detection system of FIG. 1. Step 300 generally corresponds to step 135, steps 310 and 320 generally correspond to step 140, steps 330 and 340 generally correspond to step 145, and step 350 generally corresponds to step 150.

In particular, runtime detection engine 110 can load (300) one or more classifiers and a feature set of classified behaviors received from training engine 105. Runtime detection engine 110 can generate (310) an execution graph of a received file, and extract (320) behaviors from the execution graph corresponding to the loaded feature set. This can be implemented by:
i) running the received file in a sandbox and collecting its execution trace using known or custom tools,
ii) generating an execution graph (such as those described above, for example) from the execution trace,
iii) enriching the execution graph (e.g., via labeling important nodes/edges),
iv) extracting behaviors from the execution trace, and
v) collect output (e.g., "0" if feature from feature set is not present, "1" if feature from feature set is present)

Runtime detection engine 110 can send (330) the extracted behaviors (e.g., those pertaining to the "1"s of the collected output) to the one or more classifiers for classification and receive (340) from the one or more classifiers a classification of the received file as a threat or non-threat. For example, if the one or more classifiers labels the set as "bad" then the received file is deemed a threat. if the one or more classifiers labels the set as "good" then the received file is deemed a non-threat. Runtime detection engine 110 can then output (350) the received file with a label of the classification.

Figure 6:
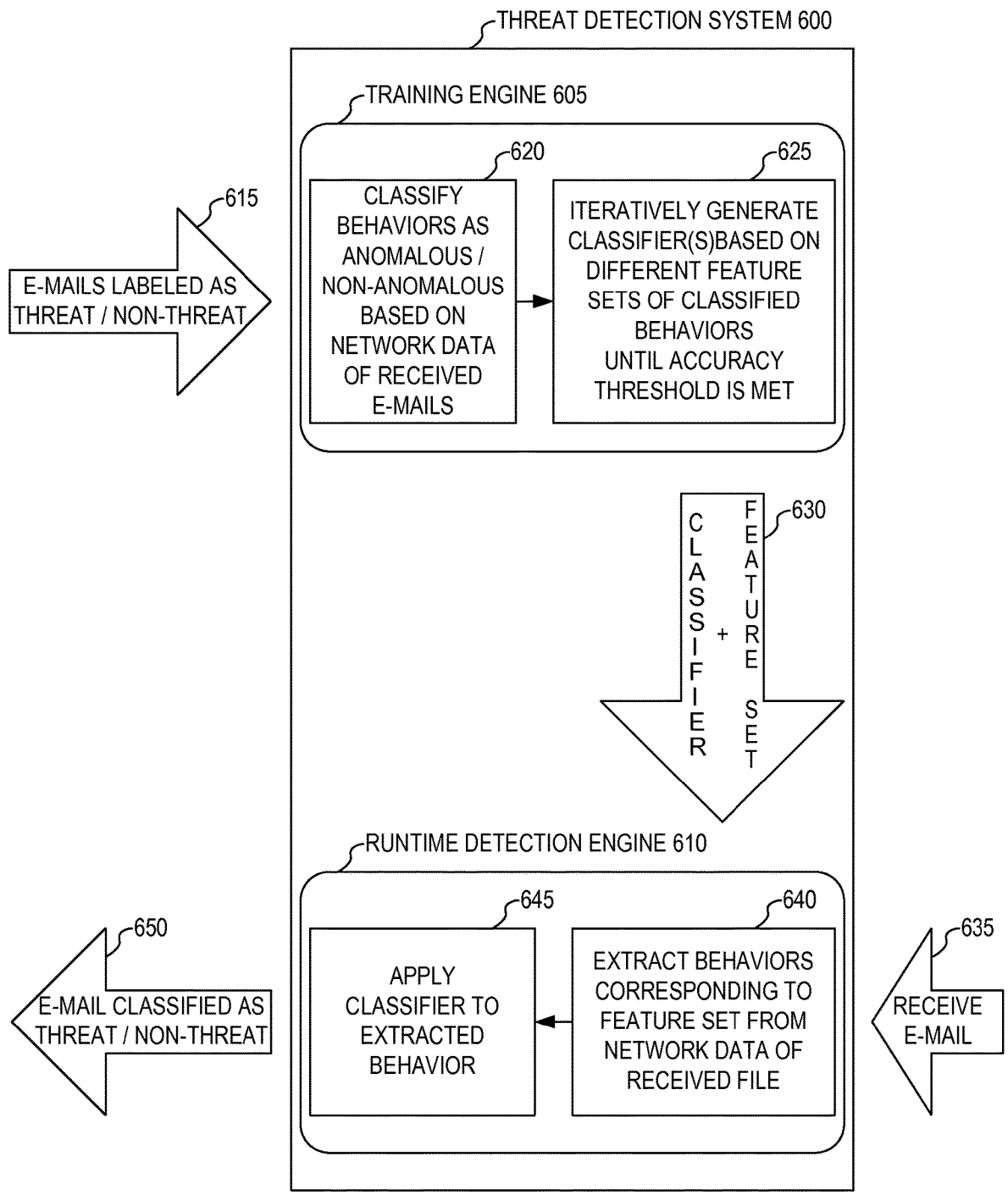
FIG. 6 illustrates an example of a threat detection system that classifies threats in received e-mails.

FIG. 6 illustrates an example of a threat detection system that classifies threats in received e-mails. Threat detection system 600 corresponds generally to threat detection system 100 except that threat detection system 600 looks at e-mail path behavior (e.g., the network path taken by the e-mail to arrive at its destination, which is usually stored in the e-mail metadata) rather than runtime execution behavior. In this way, threat detection system 600 can classify whether a received e-mail is a threat or non-threat based on the path the e-mail took over a network to arrive at its destination. Threat detection system 600 can scan e-mails at a suitable location like an e-mail server of a client in order to obtain the network information required for the classification. The functionality disclosed in threat detection system 600 can be part of or separate from the functionality provided in threat detection system 100.

For the training aspect of e-mail path detection, training engine 605 can receive (615) sample e-mail data in the form of multiple e-mails labeled as a threat (i.e., malware/bad) or non-threat (i.e., non-malware/good). The receiving of the sample e-mails can include any manner of inputting the files into training engine 605, including retrieving the e-mails, in part or whole, from a local or remote data store (e.g., a database) or loading them from other electronic media. The number of e-mails can be any suitable size, though a larger number (e.g., hundreds or thousands) can improve the accuracy of training engine 605.

Once received, training engine 605 can classify (620) behaviors of the multiple e-mails as anomalous or non-anomalous based on network data (e.g., network path information) of the e-mails, and iteratively generate (625) one or more classifiers using different feature sets of the classified behaviors per iteration until an accuracy threshold is met or exceeded. Once the accuracy threshold is met or exceeded, training engine 605 can output (630) the final one or more classifiers and the feature set of classified behaviors for classification of e-mails as a threat or non-threat.

For the runtime detection aspect of e-mail path detection, runtime detection engine 610 can load (630) the outputted one or more classifiers and the feature set of classified behaviors, receive (635) an e-mail (e.g., in real time), extract (640) from the received e-mail behaviors corresponding to the loaded feature set, apply (645) the loaded one or more classifiers to the extracted behaviors, and output (650), the received e-mail with a label of threat or non-threat based on the classification (i.e., the application of the loaded one or more classifiers to the extracted behaviors).

Figure 7:
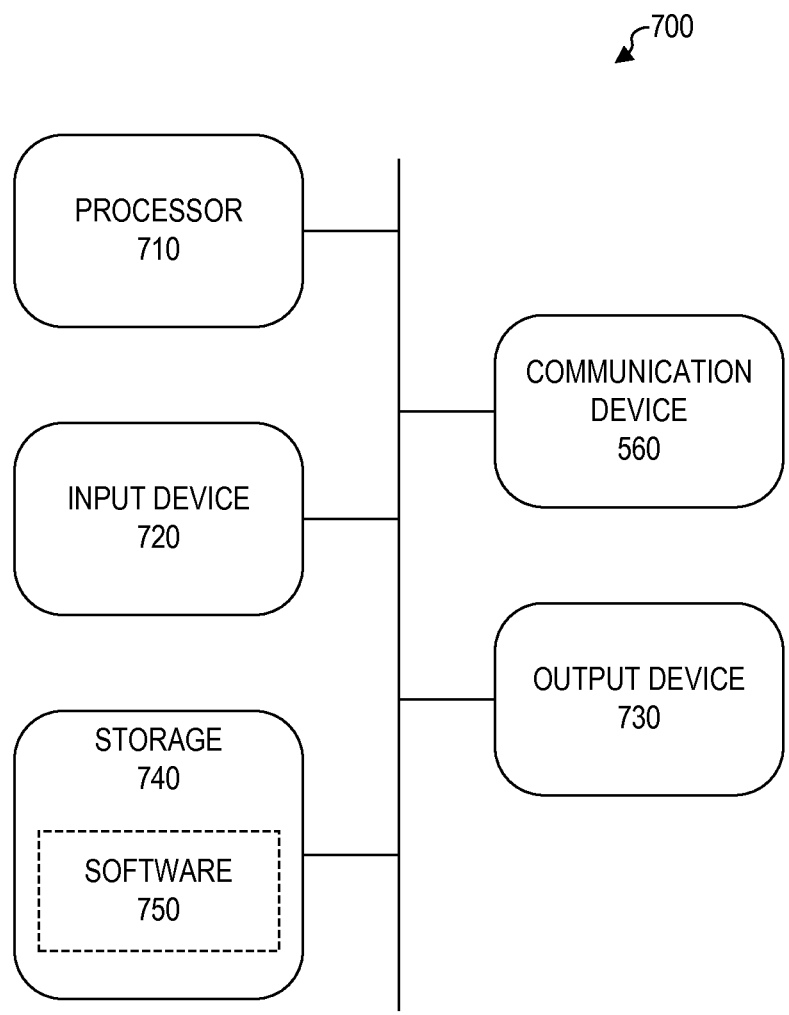
FIG. 7 is an example of a computing device.

FIG. 7 shows a block diagram of an example of a computing device, which may generally correspond to one or more components of the threat detection system disclosed above (i.e., system 100 or 600). The form of computing device 700 may be widely varied. For example, computing device 700 can be a supercomputer (e.g., a machine configured to achieve more than one petaFLOP), workstation, server, personal computer, handheld computing device, or any other suitable type of microprocessor-based device (e.g., a general purpose computer programmed or otherwise configured to carry out the functionality of the threat detection system disclosed above. Computing device 700 can include, for example, one or more components including processor 710, input device 720, output device 730, storage 740, and communication device 760. These components may be widely varied, and can be connected to each other in any suitable manner, such as via a physical bus, network line or wirelessly for example.

For example, input device 720 may include a keyboard, mouse, touch screen or monitor, voice-recognition device, or any other suitable device that provides input. Output device 730 may include, for example, a monitor, printer, disk drive, speakers, or any other suitable device that provides output.

Storage 740 may include volatile and/or nonvolatile data storage, such as one or more electrical, magnetic or optical memories such as a RAM, cache, hard drive, CD-ROM drive, tape drive or removable storage disk for example. Communication device 760 may include, for example, a wired or wireless network interface or any other suitable device capable of transmitting and receiving signals over a network.

The network (not shown) may include any suitable interconnected communication system, such as a local area network (LAN) or wide area network (WAN) for example. The network may implement any suitable communications protocol and may be secured by any suitable security protocol. The corresponding network links may include, for example, telephone lines, DSL, cable networks, T1 or T3 lines, wireless network connections, or any other suitable arrangement that implements the transmission and reception of network signals.

Software 750 can be stored in storage 740 and executed by processor 710 which may include one or more processors. Software 750 may include, for example, programming that embodies the functionality described in the various embodiments of the present disclosure such as that embodied by the threat detection system disclosed above. The programming may take any suitable form. Software 750 may include, for example, a combination of servers such as application servers and database servers.

Software 750 can also be stored and/or transported within any computer-readable storage medium for use by or in connection with an instruction execution system, apparatus, or device, such as computing device 700 for example, that can fetch instructions associated with the software from the instruction execution system, apparatus, or device and execute the instructions. In the context of this document, a computer-readable storage medium can be any medium, such as storage 740 for example, that can contain or store programming for use by or in connection with an instruction execution system, apparatus, or device.

Software 750 can also be propagated within any transport medium for use by or in connection with an instruction execution system, apparatus, or device, such as computing device 700 for example, that can fetch instructions associated with the software from the instruction execution system, apparatus, or device and execute the instructions. In the context of this document, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate engines, such as training engine 105 and runtime detection engine 110, may be performed by the same engine, and functionality illustrated to be performed by the same engine may be performed by separate engines. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer system comprising:
one or more memories storing instructions; and
one or more processors configured to execute the instructions to cause the system to:
receive multiple files each labeled as a threat or non-threat,
generate an execution graph of each of the received files,
identify behaviors of the multiple files from the execution graph;
perform anomaly detection on the identified behaviors to classify the identified behaviors as anomalous or non-anomalous based on the execution graphs,
iteratively generate one or more classifiers using different feature sets of classified behaviors per iteration until an accuracy threshold is met or exceeded, wherein if the one or more classifiers of a particular feature set do not meet or exceed the accuracy threshold, membership of the particular feature set is iteratively pruned until the accuracy threshold is met to provide a modified feature set and the one or more classifiers are generated again based on the modified feature set, and
output the one or more classifiers and a corresponding feature set of classified behaviors that met or exceeded the accuracy threshold for classification of the multiple files as either an actual threat or an actual non-threat.

2. The computer system of claim 1, wherein the multiple files labeled as threat comprise malware and the multiple files labeled as non-threats do not comprise malware.

3. The computer system of claim 1, wherein the files comprise executable files.

4. The computer system of claim 1, wherein the files comprise word processing documents.

5. The computer system of claim 1, wherein the files comprise PDF files.

6. The computer system of claim 1, wherein the generation of the execution graph comprises, for each of the received file:
running the received file in a sandbox,
collecting an execution trace of the received file while running in the sandbox, and generating the execution graph based on the collected execution trace.

7. The computer system of claim 1, wherein the generation of the execution graph comprises, for each of the received files:
running the received file in a sandbox,
monitoring the received file while running in the sandbox, and
generating the execution graph based on the monitoring of the received file.

8. The computer system of claim 1, wherein the identification of the behaviors comprises generating frequency metrics.

9. The computer system of claim 1, wherein the identification of the behaviors comprises generating volumetric metrics.

10. The computer system of claim 1, wherein the identification of the behaviors comprises generating pattern metrics.

11. A computer-implemented method comprising:
receiving, by one or more processors, multiple files each labeled as a threat or non-threat,
generating, by one or more processors, an execution graph of each of the received files,
identifying, by one or more processors, behaviors of the multiple files from the execution graph;
performing anomaly detection on the identified behaviors to classify the behaviors as anomalous or non-anomalous based on the execution graphs,
iteratively generating, by one or more processors, one or more classifiers using different feature sets of classified behaviors per iteration until an accuracy threshold is met or exceeded, wherein if the one or more classifiers of a particular feature set do not meet or exceed the accuracy threshold, membership of the particular feature set is iteratively pruned until the accuracy threshold is met to provide a modified feature set and the one or more classifiers are generated again based on the modified feature set, and
outputting, by one or more processors, the one or more classifiers and a corresponding feature set of classified behaviors that met or exceeded the accuracy threshold for classification of the multiple files as either an actual threat or an actual non-threat.

12. The method of claim 11, wherein the multiple files labeled as threat comprise malware and the multiple files labeled as non-threats do not comprise malware.

13. The method of claim 11, wherein the generation of the execution graph comprises, for each of the received files:
running the received file in a sandbox,
collecting an execution trace of the received file while running in the sandbox, and generating the execution graph based on the collected execution trace.

14. The method of claim 11, wherein the generation of the execution graph comprises, for each of the received files:
running the received file in a sandbox,
monitoring the received file while running in the sandbox, and
generating the execution graph based on the monitoring of the received file.

15. A computer system comprising:
one or more memories storing instructions;
a training engine comprising one or more processors configured to execute the stored instructions to cause the training engine to:
receive multiple files each labeled as a threat or non-threat,
generate an execution graph of each of the received files,
identify behaviors of the multiple files;
performing anomaly detection on the behaviors to classify the behaviors as anomalous or non-anomalous based on the execution graphs, iteratively generate one or more classifiers using different feature sets of classified behaviors per iteration until an accuracy threshold is met or exceeded, wherein if the one or more classifiers of a particular feature set do not meet or exceed the accuracy threshold, membership of the particular feature set is iteratively pruned until the accuracy threshold is met to provide a modified feature set and the one or more classifiers are generated again based on the modified feature set, and output the one or more classifiers and a corresponding feature set of classified behaviors that met or exceeded the accuracy threshold for classification of the multiple files as an actual threat or an actual non-threat; and a runtime detection engine comprising one or more processors configured to execute the stored instructions to cause the runtime detection engine to:

load the outputted one or more classifiers and the corresponding feature set of behaviors, receive a file, identify, from an execution graph of the received file, the behaviors corresponding to the loaded feature set, by generating the execution graph of the received file, and extracting the behaviors from the execution graph corresponding to the loaded feature set;

apply the loaded one or more classifiers to the extracted behaviors, and output the received file with a label of threat or non-threat based on the application of the loaded one or more classifiers to the extracted behaviors.

16. A computer system comprising:

one or more memories storing instructions; and one or more processors configured to execute the instructions to cause the system to:

receive multiple e-mails each labeled as a threat or non-threat, receive network data associated with each of the multiple e-mails, identify behaviors of the multiple e-mails;

perform anomaly detection on the behaviors to classify the behaviors as anomalous or non-anomalous based on the network data, iteratively generate one or more classifiers using different feature sets of classified behaviors per iteration until an accuracy threshold is met or exceeded, wherein if one or more classifiers of a particular feature set do not meet or exceed the accuracy threshold, membership of the particular feature set is iteratively pruned until the accuracy threshold is met to provide a modified feature set and one or more classifiers are generated again based on the modified feature set, and output one the or more classifiers and a corresponding feature set of classified behaviors that met or exceeded the accuracy threshold for classification of e-mails as a threat or non-threat.

17. The computer system of claim 16, wherein the network data comprises network paths associated with the received emails.

* * * * *